US012584070B2

(12) United States Patent
Shaner et al.

(10) Patent No.: US 12,584,070 B2
(45) Date of Patent: Mar. 24, 2026

(54) METALLIC BASED HYDROCARBON PYROLYSIS

(71) Applicant: MOLTEN INDUSTRIES INC., Oakland, CA (US)

(72) Inventors: Samuel Shaner, Goleta, CA (US); Andrew Caldwell, Goleta, CA (US); Brett Parkinson, Goleta, CA (US)

(73) Assignee: MOLTEN INDUSTRIES INC., Oakland, CA (US)

( * ) Notice: Subject to any disclaimer, the term of this patent is extended or adjusted under 35 U.S.C. 154(b) by 92 days.

(21) Appl. No.: 18/041,345

(22) PCT Filed: Aug. 11, 2021

(86) PCT No.: PCT/US2021/045548
§ 371 (c)(1),
(2) Date: Feb. 10, 2023

(87) PCT Pub. No.: WO2022/035963
PCT Pub. Date: Feb. 17, 2022

(65) Prior Publication Data
US 2023/0303932 A1 Sep. 28, 2023

Related U.S. Application Data

(60) Provisional application No. 63/064,567, filed on Aug. 12, 2020.

(51) Int. Cl.
*C10B 53/07* (2006.01)
*B01J 19/24* (2006.01)
*C10B 57/06* (2006.01)

(52) U.S. Cl.
CPC .............. *C10B 53/07* (2013.01); *B01J 19/24* (2013.01); *C10B 57/06* (2013.01); *B01J 2219/00076* (2013.01)

(58) Field of Classification Search
None
See application file for complete search history.

(56) References Cited

U.S. PATENT DOCUMENTS

| | | | | |
|---|---|---|---|---|
| 5,786,443 A | * | 7/1998 | Lowe | C08G 63/78 |
| | | | | 528/272 |
| 8,744,035 B1 | * | 6/2014 | Young | G21C 1/322 |
| | | | | 376/347 |

(Continued)

FOREIGN PATENT DOCUMENTS

| | | | |
|---|---|---|---|
| WO | 2019099795 A1 | 5/2019 | |
| WO | 2019226416 A1 | 11/2019 | |

(Continued)

OTHER PUBLICATIONS

Partial Search Report and Written Opinion dated Dec. 1, 2021, PCT/US2021/045548 filed on Aug. 11, 2021.

(Continued)

*Primary Examiner* — Tam M Nguyen
(74) *Attorney, Agent, or Firm* — Asif Ghias

(57) ABSTRACT

A reaction process includes introducing hydrocarbon reactants into a vessel, reacting the hydrocarbon reactants in contact with the gas phase catalyst in the vessel to produce reaction products comprising solid carbon and a gas phase product, separating the solid carbon from the gas phase products and the gas phase catalyst to produce a solid carbon product, condensing the gas phase catalyst to produce a condensed catalyst, and returning the condensed catalyst to the liquid catalyst reservoir. The vessel comprises a gas phase catalyst and a liquid catalyst reservoir containing a liquid catalyst.

16 Claims, 4 Drawing Sheets

(56)                    References Cited

U.S. PATENT DOCUMENTS

| | | | |
|---|---|---|---|
| 2014/0004011 A1* | 1/2014 | Shibata | B01J 38/00 |
| | | | 422/255 |
| 2016/0002033 A1 | 1/2016 | Noda | |
| 2018/0033500 A1* | 2/2018 | Park | G21C 15/12 |
| 2018/0033505 A1* | 2/2018 | Park | G21C 1/322 |
| 2020/0002165 A1 | 1/2020 | Desai | |
| 2020/0072560 A1* | 3/2020 | Li | F28D 9/0006 |
| 2021/0170387 A1 | 6/2021 | Rivest | |
| 2021/0210221 A1* | 7/2021 | Singh | G21C 5/06 |
| 2023/0303932 A1* | 9/2023 | Shaner | C10B 57/06 |

FOREIGN PATENT DOCUMENTS

| | | | |
|---|---|---|---|
| WO | 2021113708 A1 | 6/2021 | |
| WO | 2022035963 A2 | 2/2022 | |

OTHER PUBLICATIONS

International Search Report and Written Opinion dated Feb. 4, 2022, PCT/US2021/045548 filed on Aug. 11, 2021.
Zeng, et al., "Catalytic Methane Pyrolysis with Liquid and Vapor Phase Tellurium," ACS Catalysis, vol. 1 O Issue 15 (Jul. 13, 2020): pp. 8223-8230; entire document.
Kang, et al., "Catalytic methane pyrolysis in molten MnC12-KCI," Applied Catalysis B: Environmental, vol. 254 (May 7, 2019): pp. 659-666; entire document.
International Preliminary Report on Patentability dated Feb. 23, 2023, PCT/US2021/045548 filed on Aug. 11, 2021.

* cited by examiner

METALLIC BASED HYDROCARBON PYROLYSIS

CROSS-REFERENCE TO RELATED APPLICATIONS

This application is a filing under 35 U.S.C. 371 as the National Stage of International Application No. PCT/US2021/045548, filed on Aug. 11, 2021, entitled, "METALLIC BASED HYDROCARBON PYROLYSIS." which claims the benefit of and claims priority to U.S. Provisional Application No. 63/064,567 filed on Aug. 12, 2020 and entitled, "METALLIC BASED HYDROCARBON PYROLYSIS," both of which are incorporated herein by reference in their entirety for all purposes.

STATEMENT REGARDING GOVERNMENTALLY SPONSORED RESEARCH OR DEVELOPMENT

None.

BACKGROUND

Industrial hydrogen is produced primarily using the steam methane reforming (SMR) process, and the product effluent from the reactors contains not only the desired hydrogen product but also other gaseous species including gaseous carbon oxides ($CO/CO_2$) and unconverted methane. Separation of the hydrogen for shipment or storage and separation of the methane for recirculation back to the reformer is carried out in a pressure swing adsorption (PSA) unit, a costly and energy-intensive separation. Overall the process produces significant carbon dioxide that are released to the environment.

SUMMARY

In an embodiment, a reaction process includes introducing hydrocarbon reactants into a vessel, reacting the hydrocarbon reactants in contact with the gas phase catalyst in the vessel to produce reaction products comprising solid carbon and a gas phase product, separating the solid carbon from the gas phase products and the gas phase catalyst to produce a solid carbon product, condensing the gas phase catalyst to produce a condensed catalyst, and returning the condensed catalyst to the liquid catalyst reservoir. The vessel comprises a gas phase catalyst and a liquid catalyst reservoir containing a liquid catalyst.

In an embodiment, a reaction system for a pyrolysis reaction comprises a reactor vessel, a distributor plate disposed in a lower portion of the reactor vessel, one or more heating elements disposed in an upper portion of the reactor vessel, a liquid catalyst disposed in a lower portion of the reactor vessel above the distributor plate, a hydrocarbon gas disposed in the upper portion of the reactor vessel, and a gas phase catalyst mixed with the hydrocarbon gas in the upper portion of the reactor vessel.

In an embodiment, a reaction process comprises heating a liquid phase catalyst to produce a gas phase catalyst, passing the gas phase catalyst into a reaction passage, introducing a hydrocarbon reactant into the reaction passage in contact with the gas phase catalyst, reacting the hydrocarbon reactant in contact with the gas phase catalyst in the reaction passage to produce reaction products comprising solid carbon and a gas phase product, separating the solid carbon from the gas phase products and the gas phase catalyst to produce a solid carbon product, condensing the gas phase catalyst to produce a condensed catalyst; and returning the condensed catalyst to the liquid phase catalyst.

In an embodiment, a reaction system for a pyrolysis reaction comprises a reactor vessel, a boiler, a liquid catalyst disposed in the boiler, a reaction passage in fluid communication with a vapor outlet of the boiler, one or more feed gas inlets in fluid communication with the reaction passage, a hydrocarbon gas disposed in the reaction passage, wherein the one or more feed gas inlets are configured to pass the hydrocarbon gas into the reaction passage at one or more points, and a gas phase catalyst mixed with the hydrocarbon gas in the reaction passage. The boiler is configured to generate the gas phase catalyst from the liquid catalyst disposed in the boiler and pass the gas phase catalyst to the reaction passage.

These and other features will be more clearly understood from the following detailed description taken in conjunction with the accompanying drawings and claims.

BRIEF DESCRIPTION OF THE DRAWINGS

For a more complete understanding of the present disclosure, reference is now made to the following brief description, taken in connection with the accompanying drawings and detailed description.

DETAILED DESCRIPTION

Figure 1:
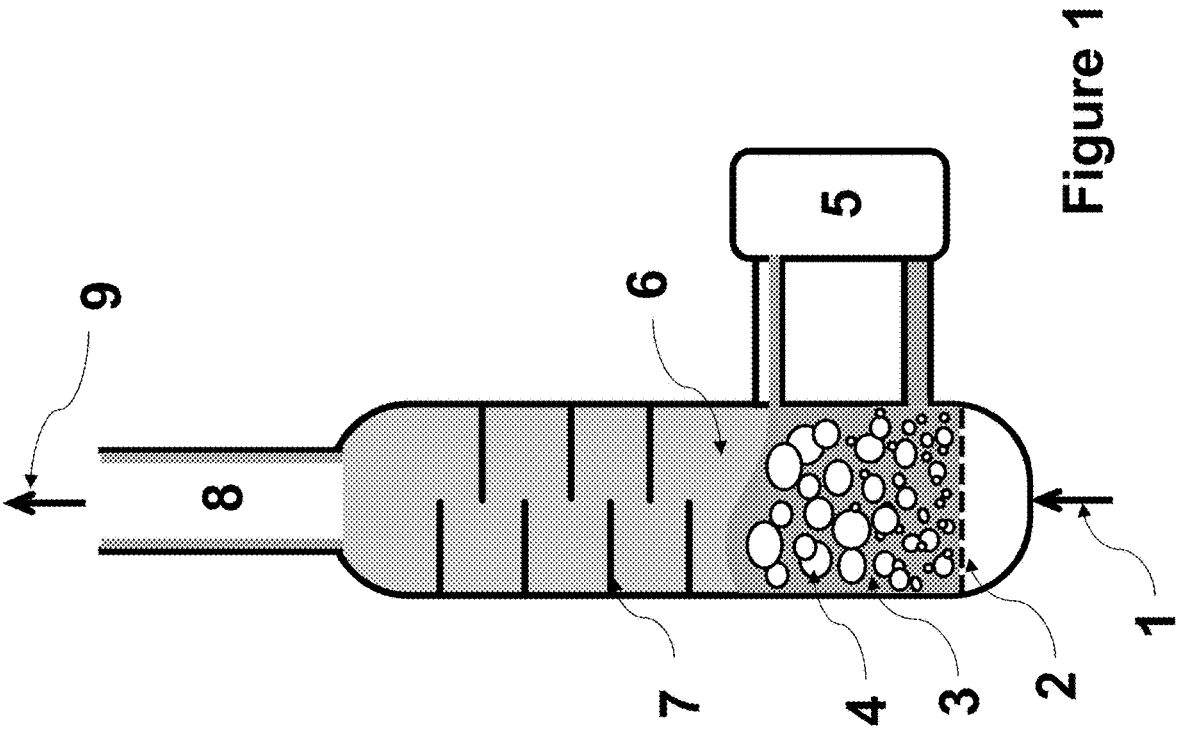
FIG. 1 is a schematic illustration of a hydrocarbon pyrolysis reactor in which the hydrocarbon gas is delivered through a column of the liquid metal catalyst.

This disclosure relates to the conversion of hydrocarbons into hydrogen gas and solid carbon. A process for the non-oxidative dehydrogenation (pyrolysis) of hydrocarbons, yielding hydrogen gas and solid carbon, using liquid-phase and/or gas-phase alkali metal catalyst(s) is disclosed. The process can include the generation of a vapor of metal catalyst that contacts a hydrocarbon reactant gas, the separation of the solid carbon product from the gas stream, and the return of the catalyst vapor to a liquid catalyst reservoir.

Steam reforming of light hydrocarbons, such as methane, for the production of hydrogen gas is a standard industrial practice, accounting for nearly all the hydrogen gas produced commercially. In this process, carbon oxide gases ($CO$, $CO_2$) are unavoidable co-products. There exists a compelling interest in producing hydrogen gas without the co-production of carbon oxides. This may be done by the non-oxidative dehydrogenation of light hydrocarbons, also referred to as hydrocarbon pyrolysis, in which the co-product of hydrogen gas is solid carbon. In the pyrolysis of methane—methane being the primary constituent of natural gas, which is an exemplary hydrocarbon reactant given its availability and cost—the reaction does not occur to an extent sufficient to compete commercially with steam reforming at temperatures less than 1100° C. in the absence of catalyst(s). Conventional solid-state catalysts for hydrocarbon dehydrogenation, such as nickel or other transition metals, deactivate in a non-oxidizing reaction environment due to the formation of solid carbon on the catalyst surface, in a phenomenon known as "coking." If the formation of carbon oxides is to be avoided, de-coking of the catalyst surface can be unfeasible for technical and/or economic reasons. The use of liquid-state catalysts has been proposed as a means of mitigating the effects of catalyst coking by providing a continuously regenerating surface.

A number of liquid compositions have been reported as being catalytic for hydrocarbon pyrolysis. One category of liquid catalysts is molten halide salt solutions exhibiting transition metal complex ions. Catalysis in these systems is thought to rely on the Lewis acidic, i.e., strongly electrophilic, nature of the transition metal species. The second category of liquid catalysts is liquid metal solutions containing transition metal elements. Known transition metal catalysts for hydrocarbon pyrolysis, such as nickel, have melting temperatures that are too high for the pure metal to be employed in the liquid state. The addition of so-called poor metals, such as bismuth, or of alkali and/or alkali-earth metals, such as potassium, lowers the melting temperature of the metallic solution such that it can be employed as a liquid catalyst for hydrocarbon pyrolysis. Mixtures of liquids from the first and second categories described above have also been demonstrated. A third category of liquid catalyst exists and is defined by the property of Lewis basicity, i.e., nucleophilicity. An example is molten hydroxide or carbonate salts, which have been demonstrated for biomass pyrolysis. These molten salts produce carbon oxides when reacted with light hydrocarbons and, as such, are not suitable for non-oxidative dehydrogenation. The alkali metals, such as lithium, sodium, and potassium, are known strong Lewis bases. However, catalysts of this type have not been described in the technical literature. In addition, these alkali metals exhibit relatively low vaporization temperatures, affording the possibility of homogeneous gas-phase catalysis. This property would be of some advantage in the pyrolysis of light hydrocarbons, since in the use of liquid-state catalysts, separation and purification of the solid carbon from the liquid catalyst is a considerable technical challenge. If, instead, a gas-phase catalyst was employed, the need to carry out solid-liquid separation processes would be considerably reduced or obviated entirely. Because the carbon produced in a gas phase reaction environment would be unwetted by the catalytic media, it could be pneumatically conveyed from the reaction volume without extensive processing. In addition, the latent heat of condensation of the gas phase catalyst can supply some or all of the heat of reaction for hydrocarbon pyrolysis, aiding in heat transfer in the vapor environment in the reactor where coking of solid heat transfer surfaces is of most concern. The use of gas-phase metal catalysts for hydrocarbon pyrolysis has not been described in the technical literature.

A method for the catalytic pyrolysis of hydrocarbons using gas-phase metals is provided herein. The catalyst can comprise one or more of the following elements: lithium, sodium, potassium, rubidium, cesium, magnesium, calcium, and aluminum. The catalysts can be used at temperatures between 600° C. and 1200° C., and at pressures between 1 bar and 50 bar. The method utilizes a gas phase, or vapor, of the metal catalyst, into which is introduced a gaseous hydrocarbon feedstock, resulting in the conversion of the hydrocarbon into hydrogen gas and solid carbon. The latent heat of condensation of the metal vapor may supply some or all of the heat of reaction for the hydrocarbon conversion. The hydrocarbon can be contacted with the gas phase catalyst in the absence or substantial absence of oxygen. The solid carbon produced in the reaction can be pneumatically conveyed out of the reactor and removed from the gas stream using conventional solid-gas separation techniques. The gas phase catalyst can be separated from the gas stream by condensation followed by returning the condensed liquid phase to the reactor. In an alternative aspect, solid carbon particles which are generated by pyrolysis or are seeded into the reactor can be fluidized in the gas-phase reaction volume to promote carbon deposition and facilitate carbon removal from the reactor via pneumatic conveying. In an alternative aspect, the hydrocarbon feedstock can be introduced to the catalytic metal, which can be kept at a temperature at or below the vaporization temperature of the metal yet at a temperature sufficient to maintain a high vapor pressure of the catalyst. Carbon removal from the reactor can then be done using a combination of gas-solid and liquid-solid separation techniques. In an alternative aspect, continuous replenishment of the catalytic metal is done in a separate unit by electrolytic decomposition of the appropriate metal-oxide or metal-halide compound and subsequent transfer of the liquid metal product to the reactor.

The embodiments as disclosed herein provide a method for the catalytic decomposition of gas-phase hydrocarbons, for example, hydrocarbons found in natural gas, into hydrogen gas and solid carbon. While the reactant hydrocarbons are described as one or more components of natural gas (e.g., methane), any hydrocarbons can be used as reactants, including those comprising one or more heteroatoms other than carbon and hydrogen (e.g., oxygen, nitrogen, etc.). The decomposition reaction can be carried out in the gas phase, using a metal vapor as the catalyst and/or in the liquid phase, using a Lewis basic molten metal. For the homogeneous gas phase pyrolysis, any suitable metal that provides catalytic activity in a hydrocarbon pyrolysis reaction can be used. In some embodiments, the metal catalyst(s) can include, but are not limited to, one or more of the following metals: lithium, sodium, potassium, rubidium, cesium, magnesium, calcium, and/or aluminum, which, either singly or mixed in some proportion, exhibit appropriate liquidus temperatures and sufficiently high vapor pressures to be used as gas phase catalysts in the temperature range of between 600° C. to 1200° C. The selection of the catalyst can be based on the boiling point of the metal or mixture, the catalytic activity of the metal or mixture, and/or the properties of the reaction and reactor.

Methods for hydrocarbon pyrolysis on solid catalysts have been demonstrated in practice. In the use of solid catalysts, separation of carbon from the catalytic media is a key technical challenge. The surfaces of solid catalysts are deactivated by carbon deposition, requiring frequent regeneration of the active surface. If the formation of carbon oxides is to be avoided, recourse must be made to mechanical abrasion, chemical washing, replacement of the catalyst, or some combination of the above. These strategies can be impracticable to implement, due to cost or technical feasibility The embodiments described herein provide a new approach for catalyzing hydrocarbon dehydrogenation without the co-production of carbon oxides by employing Lewis basic liquid-phase and/or gas-phase metals. The use of a gas-phase catalyst mitigates or circumvents the carbon-catalyst separation issue faced by conventional solid- or liquid-metal hydrocarbon pyrolysis reactors. With a gas-phase metal catalyst, carbon may be formed and entrained in the gas stream and readily separated from the gas phase using various gas/solid separation techniques such as filtration. Because the carbon is "dry," that is, largely unwetted by the catalytic media, it may be pneumatically conveyed without post-reaction processing. In these embodiments, the catalysis is homogeneous, in that both catalyst and reactant are in the same material phase. In contrast, all conventional methods of light hydrocarbon pyrolysis which rely on liquid or solid catalysts operate in a heterogeneous regime, in which the catalyst is in a condensed phase of matter and the reactant is in the gas phase.

Accordingly, in some embodiments, a reaction process can include introducing hydrocarbon reactants into a vessel. The vessel can have a gas phase catalyst and a liquid catalyst reservoir containing a liquid catalyst. The gas phase catalyst can comprise a vapor phase of at least one component of the liquid catalyst. The hydrocarbon reactants can be reacted in contact with the gas phase catalyst in the vessel to produce reaction products comprising solid carbon and a gas phase product, and the solid carbon can be separated from the gas phase products and the gas phase catalyst to produce a solid carbon product. In some aspects, the gas phase product can comprise hydrogen. The gas-phase catalyst can be condensed to produce a condensed catalyst, and the condensed catalyst can be returned to the liquid catalyst reservoir. When solid carbon is present in the liquid catalyst, either through settling or reaction of the hydrocarbon gas in contact with the liquid catalyst, the solid carbon can be separated from the liquid catalyst.

The hydrocarbon reactants can include, but are not limited to, natural gas components, gas phase hydrocarbons, biomass, polymers, and combinations thereof. The liquid catalyst can be a metal comprising at least one of: lithium, sodium, potassium, rubidium, cesium, magnesium, calcium, aluminum, or mixtures thereof. The gas phase catalyst can be a vapor phase of the liquid catalyst. In some embodiments, electrolysis can be performed in a separate unit on the appropriate molten electrolyte in order to replenish the liquid catalyst, where the electrolysis vessel is in fluid communication with the reactor vessel. In some embodiments, a diluent can be added to the liquid catalyst to modulate the catalyst vapor pressure and/or melting temperature. Diluents could include, but are not limited to: bismuth, tin, gallium, lead, indium, or mixtures thereof.

The reaction can occur at a temperature between 600° C. and 1200° C., and at a pressure between 1 bar and 50 bar. The hydrocarbon reactants can be contacted with the catalyst vapor in the gas phase volume of the vessel and/or in the liquid catalyst reservoir. For example, the hydrocarbon reactants can pass through the liquid catalyst in the liquid catalyst reservoir before passing to the gas phase zone in the upper portion of the reactor vessel. The gas phase reacting in the vessel can be heated using one or more heating elements to keep the gas phase above the condensation temperature of the gas phase catalyst. Alternatively, or, in addition, the heat of reaction may be supplied by the heat of condensation of the catalyst vapor, such as to avoid the use of heating elements in the gas phase region of the reactor. In some embodiments, the hydrocarbon reactants can be sparged through the liquid catalyst in the liquid catalyst reservoir, and the gas phase catalyst can be mixed with the hydrocarbon reactants within the liquid catalyst reservoir to form a gas phase mixture. The resulting mixture can then pass into the gas phase in the upper portion of the reactor vessel. The solid carbon product can be removed from the reaction vessel by pneumatic conveyance in a gas stream. In some embodiments, the solid carbon product can be fluidized in the gas-phase reaction volume.

The reaction process as noted above can be carried out in a number of reaction systems. In some embodiments, a reaction system suitable for carrying out the reaction process can include a reactor vessel, a distributor plate disposed in a lower portion of the reactor vessel, one or more heating elements disposed in an upper portion of the reactor vessel, a liquid catalyst disposed in a lower portion of the reactor vessel above the distributor plate, a hydrocarbon gas disposed in the upper portion of the reactor vessel, and a gas phase catalyst mixed with the hydrocarbon gas in the upper portion of the reactor vessel. The hydrocarbon gas comprises natural gas components, biomass, polymers, and combinations thereof. The liquid catalyst comprises a metal comprising at least one of: lithium, sodium, potassium, rubidium, cesium, magnesium, calcium, aluminum, or mixtures thereof.

In some embodiments, the reaction system can also include a condenser disposed at or above the upper portion of the reactor vessel. The condenser can be configured to condense the gas phase catalyst to a liquid phase catalyst. The reaction system can also include an optional separator disposed in fluid communication with the lower portion of the reactor vessel, and a separator supply line and a separator return line disposed in fluid communication with the separator and the reactor vessel. The separator can be configured to separate solid carbon from the liquid catalyst.

The reaction system can also include an optional electrolysis unit in fluid communication with the reaction vessel. The electrolysis unit can be configured to produce one or more molten metals and introduce the one or more molten metals into the reaction vessel.

In other embodiments, a reaction process can start with heating a liquid phase catalyst to produce a gas phase catalyst. The gas phase catalyst produced can be passed into a reaction passage such as tube or pipe. In some embodiments, the reaction passage can comprise a plurality of tubes or pipes arranged in parallel. A hydrocarbon reactant can be introduced into the reaction passage in contact with the gas phase catalyst, for example through one or more hydrocarbon reactant feed lines. In some embodiments, the hydrocarbon reactant can be introduced at a plurality of points along the reaction passage in the direction of flow. The hydrocarbon reactant can be reacted in contact with the gas phase catalyst in the reaction passage to produce reaction products comprising solid carbon and a gas phase product. The solid carbon can be separated from the gas phase products and the gas phase catalyst to produce a solid carbon product, and the gas-phase catalyst can be condensed to produce a condensed catalyst. The condensed catalyst can be returned to the liquid phase catalyst. The solid carbon can be separated from the condensed catalyst prior to returning the condensed catalyst to the liquid phase catalyst. The solid carbon product can be removed from the reaction vessel by pneumatic conveyance in a gas stream.

During the reaction process, the reaction passage can be heated. For example, the reaction passage tube or tubes can be positioned within a heater, and the heater can be used to heat the tubes to a reaction temperature. The reacting can occur within the reaction passage at a temperature between 600° C. and 1200° C., and at a pressure between 1 bar and 50 bar. The hydrocarbon reactants can include, but are not limited to, natural gas components, biomass, polymers, and combinations thereof. The gas phase catalyst can be a metal comprising at least one of: lithium, sodium, potassium, rubidium, cesium, magnesium, calcium, aluminum, or mixtures thereof.

In some embodiments, a reaction system for a pyrolysis reaction can include a reactor vessel, a boiler, a liquid catalyst disposed in the boiler, a reaction passage in fluid communication with a vapor outlet of the boiler, one or more feed gas inlets in fluid communication with the reaction passage, and a gas phase catalyst mixed with the hydrocarbon gas in the reaction passage. The hydrocarbon gas can be disposed in the reaction passage, and the one or more feed gas inlets can be configured to pass the hydrocarbon gas into the reaction passage at one or more points. The boiler can be configured to generate the gas phase catalyst from the liquid catalyst disposed in the boiler and pass the gas phase catalyst to the reaction passage. In some embodiments, the reactor system can also include, a condenser in fluid communication with an outlet of the reaction passage. The condenser can be configured to condense the gas phase catalyst from the reaction passage and pass the condensed gas phase catalyst to the boiler. In some aspects, the reactor system can also include a separator disposed in fluid communication with the condenser. The separator can be configured to separate solid carbon from the condensed gas phase catalyst between the condenser and the boiler.

The hydrocarbon gas can comprise natural gas components, biomass, polymers, and combinations thereof, and the liquid catalyst comprises a metal comprising at least one of: lithium, sodium, potassium, rubidium, cesium, magnesium, calcium, aluminum, or mixtures thereof. In some embodiments, the liquid catalyst can comprise a molten salt mixed with one or more molten metals, and the reaction system can also include an electrolysis unit in fluid communication with the reaction vessel. The electrolysis unit can be configured to convert at least a portion of the molten salt into the one or more molten metals and introduce the one or more molten metals into the reaction vessel. In some embodiments, a diluent can be added to the liquid catalyst to modulate the catalyst vapor pressure. Diluents could include but are not limited to: bismuth, tin, gallium, lead, indium, or mixtures thereof.

The disclosure having been generally described, the following embodiments are given as particular examples of the disclosure. It is understood that the examples are given by way of illustration and are not intended to limit the specification or the claims in any manner.

Figure 2:
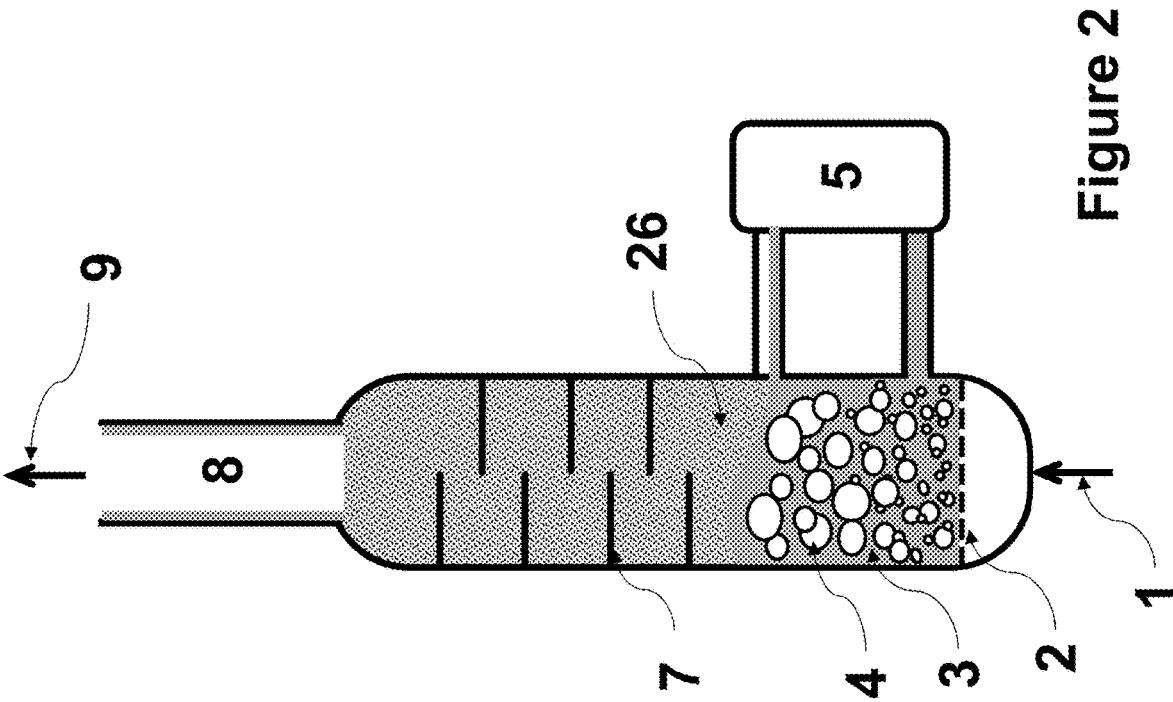
FIG. 2 is a schematic illustration of a hydrocarbon pyrolysis reactor in which the hydrocarbon gas is delivered through a column of the liquid metal catalyst, and a fluidized bed of carbon particles is maintained in the reaction volume above the liquid column.
Figure 3:
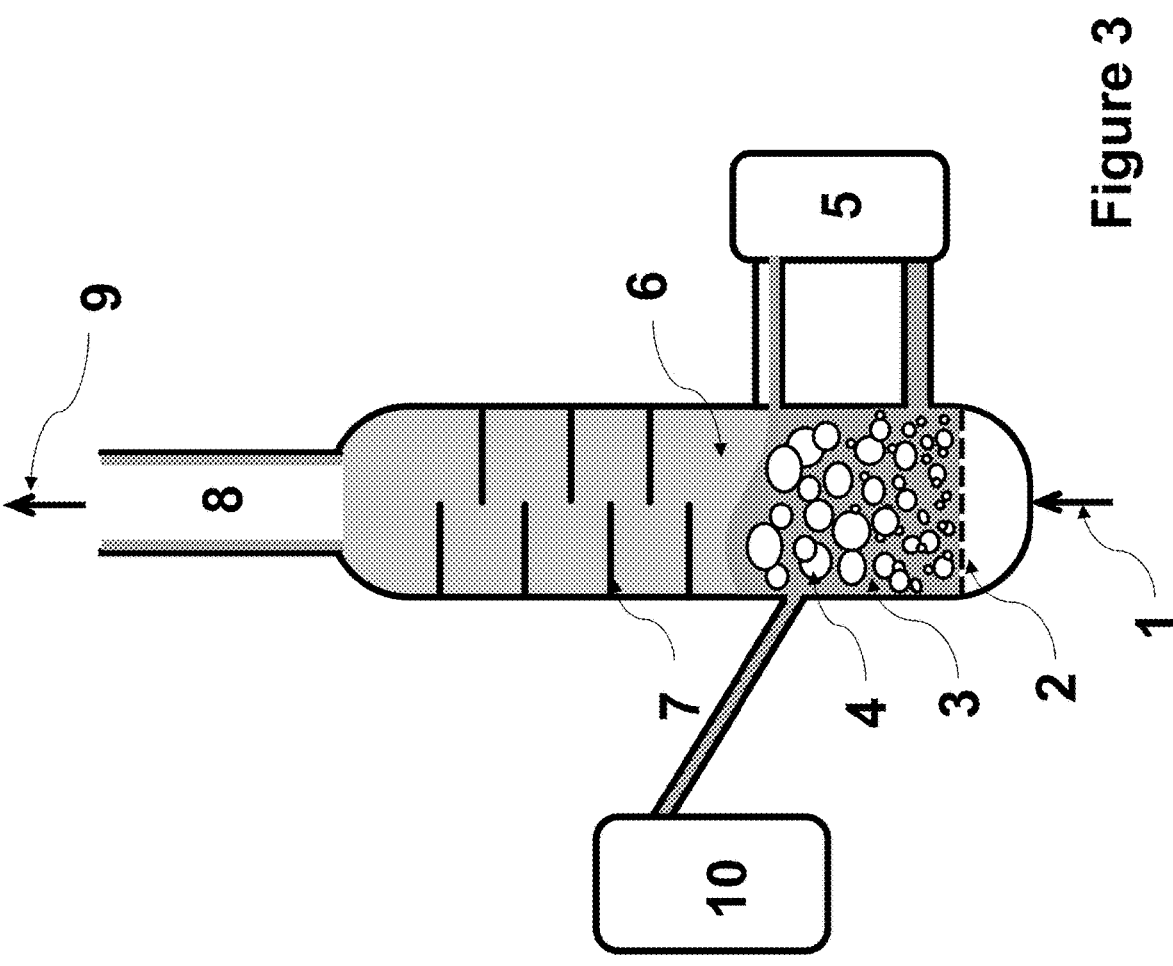
FIG. 3 is a schematic illustration of a hydrocarbon pyrolysis reactor in which the hydrocarbon gas is delivered through a column of the liquid metal catalyst, and an electrolysis cell is employed to continuously replenish lost catalyst.

In some embodiments, a reactant gas can be injected into and/or through the liquid catalyst. Various reactor configurations can be used to generate a gas phase metal catalyst that can be contacted with a hydrocarbon gas. Reference is made to FIGS. 1-3. FIG. 1 is a schematic illustration of a bubble column reactor configuration in which a hydrocarbon reactants 1 can be blown through a distributor 2 into a column of liquid metal catalyst 3. The hydrocarbon reactants 1 can comprise any gas or feed stream comprising a hydrocarbon such as hydrocarbon gas components (e.g., natural gas, etc.), biomass, polymers, or the like. The distributor 2 can serve to evenly distribute or sparge the gas throughout the liquid and control the bubble size passing into the liquid phase. The reactor can be operated so that the gas flow rate through the distributor can prevent any backflow of liquid metal through the distributor 2. The liquid metal catalyst 3 can comprise any of the catalysts described herein such as lithium, sodium, potassium, rubidium, cesium, magnesium, calcium, aluminum, or mixtures thereof, with or without the optional diluents as described herein.

The gas bubbles 4 passing through the liquid metal can be saturated with metal vapor. The gas phase leaving the liquid phase can comprise hydrocarbons from the feed gas, gas phase metal catalysts, and potentially reaction products from the start of the pyrolysis reaction. Upon exiting the melt column, the gas phase can be heated to a temperature above the vaporization temperature of the metal using heating elements such as heating elements 7. The addition of heat to the gas-phase reaction volume 6 can be used to prevent condensation of the metal catalyst due to the endothermicity of the dehydrogenation reaction. The dehydrogenation reaction can then occur within the gas phase above the liquid metal within the reactor as the gas phase rises within the reactor. During the reaction, the hydrocarbon reactants can be converted in the presence of the gas phase metal catalyst (s) to hydrogen and solid carbon. Since the reaction occurs in the gas phase, the solid carbon can form solid particles within the gas phase. The solid carbon can form particles that can agglomerate or grow throughout the reaction to form solid carbon particles having a range of particle sizes. The resulting mixture of gas phase metal catalyst(s), any remaining reactants, product hydrogen, and solid carbon can be pneumatically conveyed to the top of the reactor.

The metal catalyst within the gas phase passing to the top of the reactor can be separated from the gas stream by a condenser 8 and returned to the liquid metal pool by a falling film on the inner wall of the reactor vessel. The liquid film can coat the various surfaces within the reactor (e.g., the reactor walls, the heating elements 7, etc.), which may help to prevent direct contact between the hydrocarbon reactant and the inner surfaces of the reactor. This may help to reduce or avoid carbon formation on surfaces within the reactor. The liquid metal film may also serve to help remove (e.g., through solvation, mechanical removal, etc.) any solid carbon that forms on the various reactor surfaces during the reaction. Additionally, or alternatively, a return loop (e.g., a liquid return loop or recycle line) can be used to transfer the condensed metal catalyst to the liquid melt catalyst 3. The entrained carbon can be separated from the gas stream by conventional solid-gas separation methods 9 downstream of the reactor, which may include, but are not limited to, cyclone separation, filtration, electrostatic precipitation, and/or wet scrubbing.

Allowing for the formation of carbon in the liquid metal pool due to settling of carbon particles generated in the gas-phase reaction space, a liquid-solid separation side loop 5 can be employed. The liquid-solid separator can include, but is not limited to, the following systems and methods: filtration, vacuum evaporation, convective drying, and centrifugal drying. The resulting solid carbon can then be removed from the separator as a product, and the liquid metal can be returned to the liquid melt for further vaporization and reaction.

FIG. 2 is a schematic illustration of a variation of the bubble column type reactor shown in FIG. 1 in which solid carbon generated in the gas phase above the bubble column is fluidized to form particles 26, providing heterogeneous nucleation sites for carbon particles 26 to grow to sizes which aid in downstream separation from the gas. In this embodiment, the gas flow rate can be selected and controlled to retain the solid carbon particles 26 in a fluidized state to allow for a residence time sufficient for the solid carbon particles to grow to a desired size. The formation of larger carbon particles may assist in the downstream separation of the carbon from the gas stream. In some embodiments, a recycle stream of carbon particles 26 can be introduced into the reactor above the liquid melt to seed the gas phase reaction and allow for the particles to grow to a desired size.

FIG. 3 is a schematic illustration of a variation of the bubble column type reactor shown in FIG. 1 in which a molten salt or oxide electrolysis cell 10 supplies make-up liquid metal catalyst 3 to the pool. In some embodiments, the salt or oxide can comprise a salt or oxide of the metal or metals used in the liquid phase metal catalyst, and the electrolysis cell can be used to generate a liquid metal as a makeup within the reactor.

In some embodiments of FIG. 3, the liquid melt can comprise any of the metal catalysts described herein. Suitable salts which serve as the electrolyte in the electrolysis cell can comprise chlorides of the liquid metal catalyst(s). For example, sodium chloride can be used when sodium is used as a metal catalyst.

In some embodiments, the heat used to vaporize the metal catalyst can be supplied by the electrolysis unit 10 and/or the liquid-solid separation unit 5. In such an embodiment, heat can be supplied to the liquid melt that is sufficient to generate a gas phase metal catalyst above the boiling point such that the endothermic reaction can occur at temperatures at or above the condensation temperature of the gas phase metal catalyst. For example, when a salt/metal mixture is used, a gas phase metal catalyst can be generated above the condensation temperature of the metal from the mixture. As such, the heating elements 7 may not be needed when the liquid melt is sufficiently heated.

Figure 4:
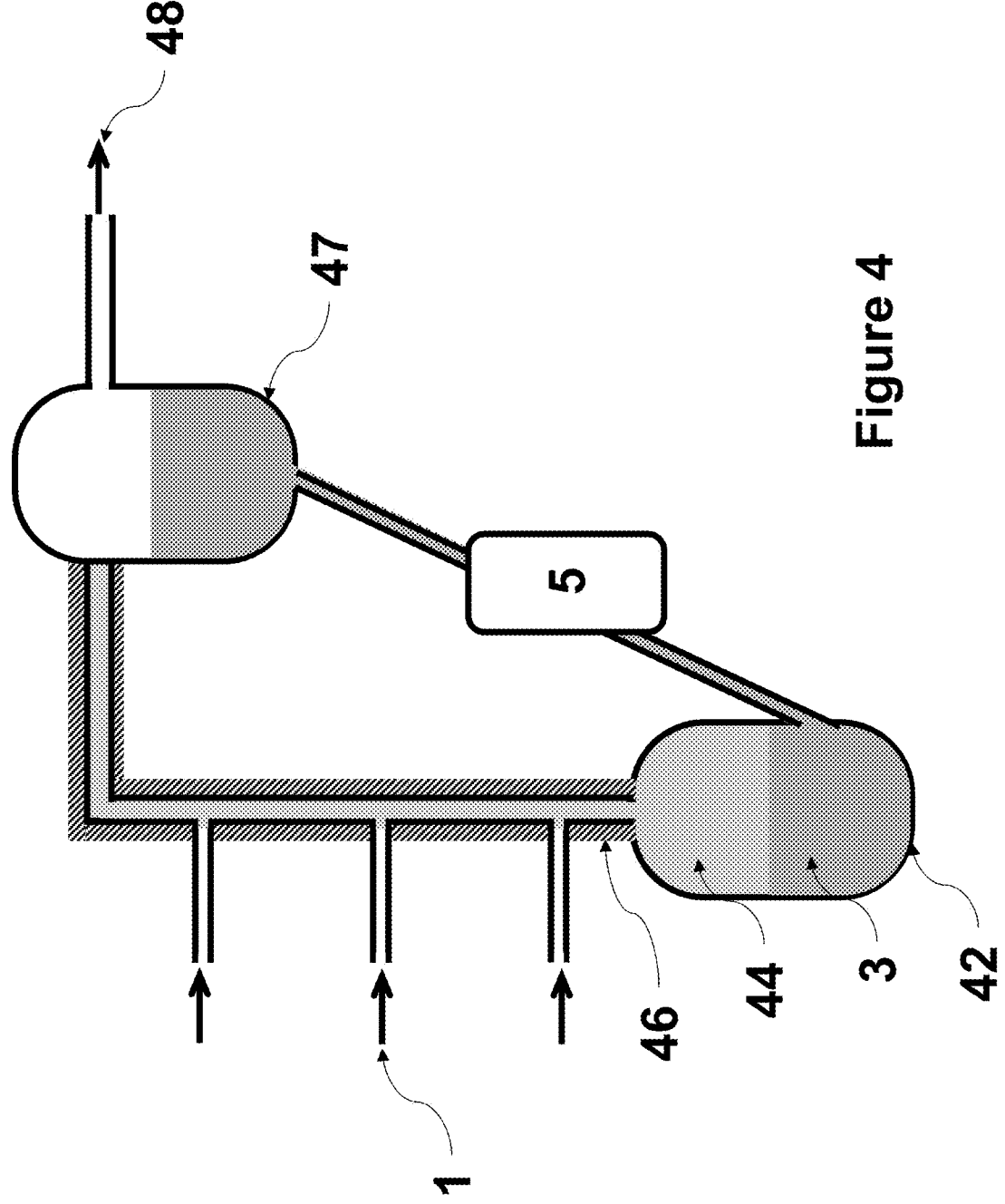
FIG. 4 is a schematic illustration of a hydrocarbon pyrolysis reactor in which the hydrocarbon gas is delivered into an externally-heated reactor volume containing the metal gas catalyst.

In some aspects, the reactant gases may not contact or pass through the liquid catalyst. FIG. 4 is a schematic illustration of a reactor configuration in which a liquid catalyst section, which in some embodiments can be a boiler 42, containing the liquid metal catalyst 3 produces a stream of the gas phase catalyst as a metal gas 44 that is delivered through pipes or connections 46 and externally heated to above the vaporization temperature of the metal. In some embodiments, the metal gas 44 can be a high pressure metal gas stream. The resulting gas phase metal catalyst can then be passed through one or more conduits or pipes 46 where the reaction can occur. While only one pipe 46 is shown in FIG. 4 for purposes of illustration, a plurality of pipes can also be connected to the boiler 42 in parallel. For example, a tubing bundle can be in fluid communication with the boiler 42 and provided in a heat bath such that the tubes are heated as the gas phase metal catalyst passes through the tubes. Any number of tubes can be used to provide the desired flow rate and reaction volume desired.

A feed stream comprising a hydrocarbon reactant 1 can be injected into the pipes downstream of the boiler 42 to provide contact between the gas phase metal catalyst 44 and the hydrocarbon reactant 1. The hydrocarbon reactant 1 can comprise any of the reactants described herein. Based on the downstream injection of the hydrocarbon reactant 1, the hydrocarbon reactant 1 may not contact the metal in the liquid phase within the boiler 42. In some embodiments, the hydrocarbon reactant 1 can be introduced into the gas phase metal reactant at or near the outlet of the boiler 42, and the reaction can occur as the reactants and gas phase metal catalyst flow through the pipe(s) 46.

In some embodiments, the reactor can comprise a plurality of hydrocarbon reactant injection points along the length of the pipe 46. The use of multiple injection points can be used to selectively introduce the hydrocarbon reactant into the mixture comprising the gas phase metal catalyst to control the reaction and/or temperature profile along the length of the pipe 46. In this embodiment, the hydrocarbon reactant can be introduced in equal amounts at a plurality of injection points or in unequal amounts to control the reaction parameters. While three introduction points are shown in FIG. 4, two injection points or more than three injection points can also be used.

The resulting reaction products can pass out of the pipe(s) 46, and the metal catalyst can be removed from the gas stream in a condenser 47. The condensed, liquid phase metal can be returned to the boiler 42 through a recycle line and the product stream 48 can leave the system. In order to allow for the formation of solid carbon in the liquid metal due to settling of carbon particles generated in the gas-phase reaction space, a liquid-solid separation side loop 5 can optionally be employed, which may include, but is not limited to, the following systems and methods: filtration, vacuum evaporation, convective drying, and centrifugal drying. The solid carbon removed from the liquid metal can be removed from the system as a product. The entrained solid carbon in the remaining gas phase can be separated from the gas stream 48 by conventional solid-gas separation methods, which may include, but are not limited to, cyclone separation, filtration, electrostatic precipitation, and wet scrubbing. The remaining gas can be further separated to provide a hydrogen product. Any remaining hydrocarbon reactant can be recycled within the system as a feed gas or used elsewhere (e.g., as a fuel gas, etc.).

Having described various systems and methods, certain aspects can include, but are not limited to:

In a first aspect, a reaction process comprises: introducing hydrocarbon reactants into a vessel, wherein the vessel comprises a gas phase catalyst and a liquid catalyst reservoir containing a liquid catalyst; reacting the hydrocarbon reactants in contact with the gas phase catalyst in the vessel to produce reaction products comprising solid carbon and a gas phase product; separating the solid carbon from the gas phase products and the gas phase catalyst to produce a solid carbon product; condensing the gas-phase catalyst to produce a condensed catalyst; and returning the condensed catalyst to the liquid catalyst reservoir.

A second aspect can include the process of the first aspect, further comprising: separating the solid carbon from the liquid catalyst.

A third aspect can include the process of the first or second aspect, wherein the hydrocarbon reactants include, but are not limited to, natural gas components, biomass, polymers, and combinations thereof.

A fourth aspect can include the process of any one of the first to third aspects, wherein the catalyst is a metal comprising at least one of: lithium, sodium, potassium, rubidium, cesium, magnesium, calcium, aluminum, or mixtures thereof.

A fifth aspect can include the process of any one of the first to fourth aspects, wherein the liquid catalyst contains a diluent comprising at least one of: bismuth, tin, gallium, lead, indium, or mixtures thereof.

A sixth aspect can include the process of any one of the first to fifth aspects, wherein the reaction occurs at a temperature between 600° C. and 1200° C., and at a pressure between 1 bar and 50 bar.

A seventh aspect can include the process of any one of the first to sixth aspects, wherein the hydrocarbon reactants are contacted with the catalyst vapor in the gas phase volume of the vessel and in the liquid catalyst reservoir.

An eighth aspect can include the process of any one of the first to seventh aspects, wherein the heat of condensation of the catalyst vapor supplies some or all of the heat of reaction for the hydrocarbon reactants.

A ninth aspect can include the process of any one of the first to eighth aspects, wherein the solid carbon product is removed from the reaction vessel by pneumatic conveyance in a gas stream.

A tenth aspect can include the process of any one of the first to ninth aspects, wherein the solid carbon product is fluidized in the gas-phase reaction volume.

An eleventh aspect can include the process of any one of the first to tenth aspects, wherein introducing the hydrocarbon reactants into the vessel comprises: sparging the hydrocarbon reactants through the liquid catalyst in the liquid catalyst reservoir; mixing the gas phase catalyst with the hydrocarbon reactants within the liquid catalyst reservoir to form a gas phase mixture; and passing the gas phase mixture into a gas phase within the vessel.

A twelfth aspect can include the process of any one of the first to eleventh aspects, further comprising: heating the hydrocarbon reactants and the gas phase catalyst within the vessel.

A thirteenth aspect can include the process of the twelfth aspect, further comprising: performing electrolysis on the liquid catalyst in an electrolysis vessel, wherein the electrolysis vessel is in fluid communication with the vessel; forming the liquid catalyst from the molten salt in response to the electrolysis; and introducing the liquid catalyst from the electrolysis vessel into the vessel.

In a fourteenth aspect, a reaction system for a pyrolysis reaction comprises: a reactor vessel; a distributor plate disposed in a lower portion of the reactor vessel; one or more heating elements disposed in an upper portion of the reactor vessel; a liquid catalyst disposed in a lower portion of the reactor vessel above the distributor plate; a hydrocarbon gas disposed in the upper portion of the reactor vessel; and a gas phase catalyst mixed with the hydrocarbon gas in the upper portion of the reactor vessel.

A fifteenth aspect can include the reaction system of the fourteenth aspect, further comprising: a condenser disposed at or above the upper portion of the reactor vessel, wherein the condenser is configured to condense the gas phase catalyst to a liquid phase catalyst.

A sixteenth aspect can include the reaction system of the fourteenth or fifteenth aspect, further comprising: a separator disposed in fluid communication with the lower portion of the reactor vessel; and a separator supply line and a separator return line disposed in fluid communication with the separator and the reactor vessel, wherein the separator is configured to separate solid carbon from the liquid catalyst.

A seventeenth aspect can include the reaction system of any one of the fourteenth to sixteenth aspects, wherein the reaction system comprises: an electrolysis unit in fluid communication with the reaction vessel, wherein the electrolysis unit is configured to convert at least a portion of a molten salt into the one or more molten metals and introduce the one or more molten metals into the reaction vessel.

An eighteenth aspect can include the reaction system of any one of the fourteenth to seventeenth aspects, wherein the hydrocarbon gas comprises natural gas components, biomass, polymers, and combinations thereof.

A nineteenth aspect can include the reaction system of any one of the fourteenth to eighteenth aspects, wherein the liquid catalyst comprises a metal comprising at least one of: lithium, sodium, potassium, rubidium, cesium, magnesium, calcium, aluminum, or mixtures thereof.

A twentieth aspect can include the reaction system of any one of the fourteenth to nineteenth aspects, wherein the liquid catalyst contains a diluent comprising at least one of: bismuth, tin, gallium, lead, indium, or mixtures thereof.

In a twenty first aspect, a reaction process comprises: heating a liquid phase catalyst to produce a gas phase catalyst; passing the gas phase catalyst into a reaction passage; introducing a hydrocarbon reactant into the reaction passage in contact with the gas phase catalyst; reacting the hydrocarbon reactant in contact with the gas phase catalyst in the reaction passage to produce reaction products comprising solid carbon and a gas phase product; separating the solid carbon from the gas phase products and the gas phase catalyst to produce a solid carbon product; condensing the gas-phase catalyst to produce a condensed catalyst; and returning the condensed catalyst to the liquid phase catalyst.

A twenty second aspect can include the reaction process of the twenty first aspect, wherein introducing the hydrocarbon reactant comprising: introducing the hydrocarbon reactant at a plurality of points along the reaction passage.

A twenty third aspect can include the reaction process of the twenty first or twenty second aspect, further comprising: heating the reaction passage during the reacting.

A twenty fourth aspect can include the reaction process of the twenty first aspect, further comprising: separating the solid carbon from the condensed catalyst prior to returning the condensed catalyst to the liquid phase catalyst.

A twenty fifth aspect can include the reaction process of any one of the twenty first to twenty fourth aspects, wherein the hydrocarbon reactants include, but are not limited to, natural gas components, biomass, polymers, and combinations thereof.

A twenty sixth aspect can include the reaction process of any one of the twenty first to twenty fifth aspects, wherein the catalyst is a metal comprising at least one of: lithium, sodium, potassium, rubidium, cesium, magnesium, calcium, aluminum, or mixtures thereof.

A twenty seventh aspect can include the reaction process of any one of the twenty first to twenty sixth aspects, wherein the liquid catalyst contains a diluent comprising at least one of: bismuth, tin, gallium, lead, indium, or mixtures thereof.

A twenty eighth aspect can include the reaction process of any one of the twenty first to twenty seventh aspects, wherein the reacting occurs within the reaction passage at a temperature between 600° C. and 1200° C., and at a pressure between 1 bar and 50 bar.

A twenty ninth aspect can include the reaction process of any one of the twenty first to twenty eighth aspects, wherein the solid carbon product is removed from the reaction vessel by pneumatic conveyance in a gas stream.

In a thirtieth aspect, a reaction system for a pyrolysis reaction comprises: a reactor vessel; a boiler, a liquid catalyst disposed in the boiler; a reaction passage in fluid communication with a vapor outlet of the boiler; one or more feed gas inlets in fluid communication with the reaction passage; a hydrocarbon gas disposed in the reaction passage, wherein the one or more feed gas inlets are configured to pass the hydrocarbon gas into the reaction passage at one or more points; and a gas phase catalyst mixed with the hydrocarbon gas in the reaction passage, wherein the boiler is configured to generate the gas phase catalyst from the liquid catalyst disposed in the boiler and pass the gas phase catalyst to the reaction passage.

A thirty first aspect can include the reaction system of the thirtieth aspect, further comprising: a condenser in fluid communication with an outlet of the reaction passage, wherein the condenser is configured to condense the gas phase catalyst from the reaction passage and pass the condensed gas phase catalyst to the boiler.

A thirty second aspect can include the reaction system of the thirtieth or thirty first aspect, further comprising: a separator disposed in fluid communication with the condenser, wherein the separator is configured to separate solid carbon from the condensed gas phase catalyst between the condenser and the boiler.

A thirty third aspect can include the reaction system of any one of the thirtieth to thirty second aspects, wherein the reaction system comprises: an electrolysis unit in fluid communication with the reaction vessel, wherein the electrolysis unit is configured to convert at least a portion of a molten salt into the one or more molten metals and introduce the one or more molten metals into the reaction vessel.

A thirty fourth aspect can include the reaction system of any one of the thirtieth to thirty third aspects, wherein the hydrocarbon gas comprises natural gas components, biomass, polymers, and combinations thereof.

A thirty fifth aspect can include the reaction system of any one of the thirtieth to thirty fourth aspects, wherein the liquid catalyst comprises a metal comprising at least one of: lithium, sodium, potassium, rubidium, cesium, magnesium, calcium, aluminum, or mixtures thereof.

A thirty sixth aspect can include the reaction system of any one of the thirtieth to thirty fifth aspects, wherein the liquid catalyst contains a diluent comprising at least one of: bismuth, tin, gallium, lead, indium, or mixtures thereof.

Additionally, the section headings used herein are provided for consistency with the suggestions under 37 C.F.R. 1.77 or to otherwise provide organizational cues. These headings shall not limit or characterize the invention(s) set out in any claims that may issue from this disclosure. Specifically, and by way of example, although the headings might refer to a "Field," the claims should not be limited by the language chosen under this heading to describe the so-called field. Further, a description of a technology in the "Background" is not to be construed as an admission that certain technology is prior art to any invention(s) in this disclosure. Neither is the "Summary" to be considered as a limiting characterization of the invention(s) set forth in issued claims. Furthermore, any reference in this disclosure to "invention" in the singular should not be used to argue that there is only a single point of novelty in this disclosure. Multiple inventions may be set forth according to the limitations of the multiple claims issuing from this disclosure, and such claims accordingly define the invention(s), and their equivalents, that are protected thereby. In all instances, the scope of the claims shall be considered on their own merits in light of this disclosure, but should not be constrained by the headings set forth herein.

Use of broader terms such as comprises, includes, and having should be understood to provide support for narrower terms such as consisting of, consisting essentially of, and comprised substantially of. Use of the term "optionally," "may," "might," "possibly," and the like with respect to any element of an embodiment means that the element is not required, or alternatively, the element is required, both alternatives being within the scope of the embodiment(s). Also, references to examples are merely provided for illustrative purposes, and are not intended to be exclusive.

While preferred embodiments have been shown and described, modifications thereof can be made by one skilled in the art without departing from the scope or teachings herein. The embodiments described herein are exemplary only and are not limiting. Many variations and modifications of the systems, apparatus, and processes described herein are possible and are within the scope of the disclosure. For example, the relative dimensions of various parts, the materials from which the various parts are made, and other parameters can be varied. Accordingly, the scope of protection is not limited to the embodiments described herein, but is only limited by the claims that follow, the scope of which shall include all equivalents of the subject matter of the claims. Unless expressly stated otherwise, the steps in a method claim may be performed in any order. The recitation of identifiers such as (a), (b), (c) or (1), (2), (3) before steps in a method claim are not intended to and do not specify a particular order to the steps, but rather are used to simplify subsequent reference to such steps.

Also, techniques, systems, subsystems, and methods described and illustrated in the various embodiments as discrete or separate may be combined or integrated with other systems, modules, techniques, or methods without departing from the scope of the present disclosure. Other items shown or discussed as directly coupled or communicating with each other may be indirectly coupled or communicating through some interface, device, or intermediate component, whether electrically, mechanically, or otherwise. Other examples of changes, substitutions, and alterations are ascertainable by one skilled in the art and could be made without departing from the spirit and scope disclosed herein.

The invention claimed is:

1. A reaction process comprising:

heating a liquid phase catalyst in a liquid catalyst section to produce a gas phase catalyst;

passing the gas phase catalyst into a reaction passage comprising one or more pipes or connections;

introducing a hydrocarbon reactant into the reaction passage in contact with the gas phase catalyst, wherein the hydrocarbon reactant is introduced via one or a plurality of injection points along an axial length of each of the one or more pipes or connections;

reacting the hydrocarbon reactant in contact with the gas phase catalyst in the reaction passage to produce a product gas comprising hydrogen, unreacted hydrocarbon reactant, and entrained solid carbon, wherein the hydrocarbon reactant does not contact liquid phase catalyst in the reaction passage or the liquid catalyst section;

removing the product gas comprising the entrained solid carbon from the reaction passage;

separating the entrained solid carbon from the product gas;

cooling the product gas after separating the solid carbon therefrom, whereby the gas phase catalyst in the product gas condenses and the condensed catalyst separates from the product gas; and returning the condensed catalyst to the liquid catalyst section, wherein the solid carbon is not wetted by the liquid phase catalyst.

2. The reaction process of claim 1, wherein introducing the hydrocarbon reactant comprises:

introducing the hydrocarbon reactant at a plurality of points along the axial length of each of the one or more pipes or connections of the reaction passage.

3. The reaction process of claim 1, further comprising:

heating the reaction passage during the reacting.

4. The reaction process of claim 1, wherein a portion of the solid carbon is present in the condensed catalyst, and further comprising:

separating the solid carbon from the condensed catalyst prior to returning the condensed catalyst to the liquid catalyst section.

5. The reaction process of claim 1, wherein the hydrocarbon reactants comprise natural gas components, biomass, polymers, and combinations thereof.

6. The reaction process of claim 1, wherein the catalyst is a metal comprising at least one of: lithium, sodium, potassium, rubidium, cesium, magnesium, calcium, aluminum, or mixtures thereof.

7. The reaction process of claim 1, wherein the liquid catalyst contains a diluent comprising at least one of: bismuth, tin, gallium, lead, indium, or mixtures thereof.

8. The reaction process of claim 1, wherein the reacting occurs within the reaction passage at a temperature between 600° C. and 1200° C., and at a pressure between 1 bar and 50 bar.

9. The reaction process of claim 1, wherein the solid carbon product is removed from the reaction passage by pneumatic conveyance in a gas stream.

10. The reaction process of claim 1, wherein the reaction passage comprises a plurality of pipes or connections.

11. The reaction process of claim 1, wherein heating the liquid phase catalyst to produce the gas phase catalyst is effected in a boiler configured to generate the gas phase catalyst from the liquid phase catalyst disposed in the boiler and pass the gas phase catalyst to the reaction passage.

12. The reaction process of claim 11, wherein condensing the gas phase catalyst to produce the condensed catalyst is effected in a condenser having an inlet fluidly connected with the reaction passage and an outlet fluidly connected via a recycle line with the boiler.

13. The reaction process of claim 12, wherein a portion of the solid carbon is present in the condensed catalyst, and wherein the process further comprises separating the solid carbon from condensed catalyst via a solid/liquid separator on the recycle line.

14. The reaction process of claim 1, further comprising heating the reaction passage to a temperature above the boiling point of the gas phase catalyst.

15. The reaction process of claim 14, wherein heating the reaction passage comprises externally heating the reaction passage to a temperature above a vaporization temperature of a metal of the liquid phase catalyst.

16. The reaction process of claim 1, wherein the hydrocarbon reactant is introduced via a plurality of injection points along the axial length of each of the one or more pipes or connections.

\*    \*    \*    \*    \*